Aug. 1, 1961 D. E. PEERMAN 2,994,456
METALLIC CONTAINERS
Filed Oct. 5, 1959
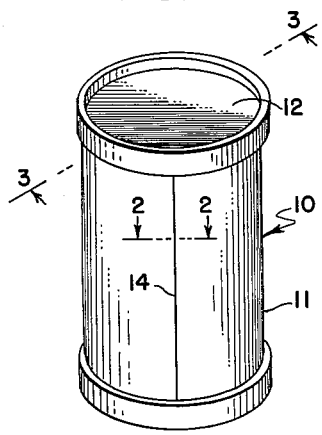
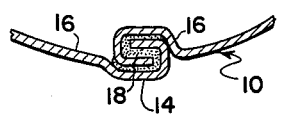
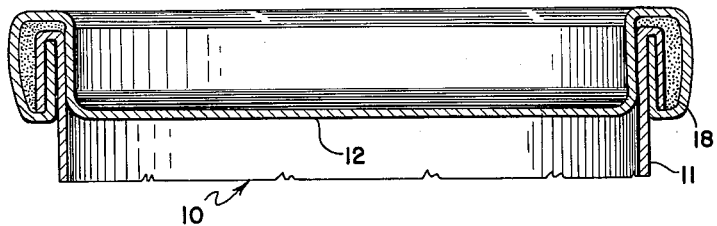
INVENTOR.
DWIGHT E. PEERMAN
BY Patrick J. Span
ATTORNEY

United States Patent Office 2,994,456
Patented Aug. 1, 1961

2,994,456
METALLIC CONTAINERS
Dwight E. Peerman, Minneapolis, Minn., assignor to General Mills, Inc., a corporation of Delaware
Filed Oct. 5, 1959, Ser. No. 844,489
3 Claims. (Cl. 220—81)

This invention relates to metallic containers and in particular to metallic containers having seams bonded with an adhesive or cement composed of the reaction product of a resinous polyamide composition and epoxy resins.

In the past, metallic containers have had their seams bonded with metallic solder. Various resins have been proposed for cementing the seams of such containers as a substitute for the solder. However, in general, such resins have not been entirely successful in becoming a substitute for the metallic solder. One deficiency common to many of the resins proposed is poor adhesion to many of the metal surfaces. It has now been found that containers having their seams bonded with an adhesive which is the reaction product of resinous polyamides and epoxy resins are as good as or superior to metallic cans or containers having their seams bonded with metallic solder.

It is therefore an object of this invention to provide a container having seams bonded with an adhesive which is the reaction product of resinous polyamides and epoxy resins.

In the drawing:

FIGURE 1 is a perspective view of a metallic container;

FIGURE 2 is a partial sectional view taken along line 2—2 of FIGURE 1, showing in detail a side seam of the container; and FIGURE 3 is a partial sectional view along line 3—3 of FIGURE 1, showing in detail the end closure and seams of the container.

In making metallic containers such as cans, the operation is highly mechanized and automatic devices are used which serve to form and shape the parts and to bring the parts together for formation of seams. These devices are mechanically timed to operate at high rates of speed. Successive parts to be joined follow one another in very short intervals. Moreover automatic can-making machines are equipped with thermostatically controlled heaters which heat the adhesive to a specific and limited temperature range at which the adhesive is soft or liquid. It is essential in such operation that the bonding agent at this temperature be sufficiently soft and have suitable viscosity characteristics such that it will flow onto the seam portion of the can and such that it will develop adhesive characteristics within a certain limited period of time. The bonding agent must not only possess requisite adhesive characteristics but it is also important that these characteristics do not change when a quantity of the adhesive is held in a molten condition for a considerable period of time. For example, there should be no appreciable change in the melting point of the adhesive while it is being held at application temperature since this might affect the ability of the adhesive to adhere to the can part or its ability to set up within the required short interval involved in the seam-making operation. It is important that the bonded seams will not fail when the can is subjected to ordinary handling in manufacture, packing and shipping. In addition the products in the cans should not in any way be affected by the metallic container or the adhesive used. In the case of cans for solvents and oils the adhesive must not be soluble in these materials but should retain its adhesive properties under such circumstances.

Referring to the drawing, a container 10 is shown in FIGURE 1 having a body 11 and end closures 12 and side seam 14. FIGURE 2 shows the side seam 14 in detail which is composed of interfolded layers 16 with an adhesive 18 therebetween. A seam by which the end closure 12 is joined to body 11 is shown in FIGURE 3. Again the seam is formed of interfolded layers with the adhesive 18 therebetween.

The containers of the present invention may be made of any metal conventionally used in making containers. Illustrative of the metals which are used are steel, aluminum, copper, bronze, tin plate and the like. As the containers are generally formed of sheet metal, the seams are usually formed of interfolded metal layers. An adhesive is used in the seams to serve to strengthen the mechanical joints formed during can manufacture, thereby yielding a stronger and more rigid container. The adhesive also serves as a sealant to fully contain the ingredients of the container which is impossible of accomplishment by mechanical means alone.

The adhesives used in the present invention for bonding the seams of the sheet metal containers fulfill all the required properties for such an adhesive. The adhesive is heat stable and relatively little change in melting point is observed as the product is held in the molten state for an extended period of time. The adhesive is non-toxic and possesses the required adhesive and cohesive strength for the application. In addition seams bonded with this material are tough and resilient and remain intact during the usual conditions of handling both in fabrication of the can as well as in packing of the can and in shipment through the ordinary channels of distribution.

As stated previously the adhesive used in the seams of the present containers is the reaction product of a resinous polyamide composition and epoxy resins. The epoxy resins which may be employed are complex polymeric reaction products of polyhydric phenols with polyfunctional halohydrins and/or glycerol dichlorohydrate. The products thus obtained contain terminal epoxy groups. A large number of epoxy resins of this type are disclosed in Greenlee Patents 2,585,115 and 2,589,245. In addition, several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenyl) propane (Bisphenol A), the resin having the following theoretical structural formula

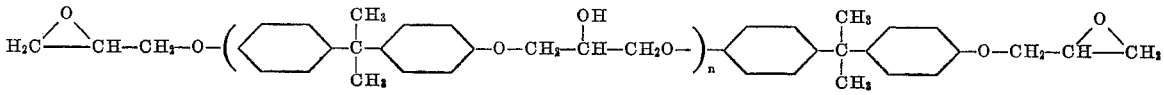

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent weight of pure epoxy resins being the molecular weight of the resin divided by the mean number of oxirane oxygens per molecule. While certain specific epoxy resins which are the most readily available have been described, it is understood that the epoxy resinous compositions encompassed by this invention are those epoxy resins having an epoxy equivalent weight of 170 to 1000, the preferred epoxy equivalent weight being 185 to 600 expressed in terms of grams of compound per epoxy group.

The resinous polyamide composition which may be employed in this invention is a blend of a hard and tough polyamide resin derived by the condensation of an aliphatic polyamine with a mixture of acids including polymeric fat acids, and a softer tacky polyamide resin made by the condensation of a polalkylene polyamine with polymeric fat acids. This blend of polyamide resins is then subjected to a heat treatment which serves to modify the chemical and physical properties of the composition such that a composition particularly adapted for use as an adhesive is obtained.

As was pointed out above, the composition of the present invention is composed of a blend of two polyamides, hereinafter referred to as resin A and resin B. It has been discovered that by heat bodying resin A, i.e. holding the resin in a molten state for a period of time to effect an increase in its viscosity, and thereafter combining it with a lesser portion of resin B and heat treating the mixture in a manner more fully described, hereinafter, an adhesive composition results which not only has the desirable properties described above but is also superior to similar prior polyamide resin adhesives.

Both of the above-mentioned polyamides are prepared at least in part from polymeric fat acids. The polymeric fat acids employed are those resulting from the polymerization of drying or semidrying oils or their free acids or the simple aliphatic alcohol esters of these acids, particularly sources rich in linoleic acid. Simple drying or semidrying oils include soybean, linseed, tung, perilla, cottonseed, corn, sunflower, safflower, and dehydrated castor. Suitable fatty acids may also be obtained from tall oil, soap stock, and other similar materials. In the polymerization process for the preparation of the polymeric fat acids, the fatty acids with sufficient double bond functionality combine for the most part probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. For example, mono or polyene fatty acids may be polymerized in the presence of ditertiary-butyl peroxide to yield polymeric fat acids useful in the present invention. The term "polymeric fat acids" as used herein is intended to include any individual polymerized fat acid as well as a polymerized mixture of acids, the latter usually containing a predominant portion of dimer acids, a small quantity of trimer and higher polymeric fat acids and some residual monomer.

While a variety of polymeric fat acids may be used, the most readily available source of such acids is through the polymerization of linoleic acid or linolenic acid rich materials. It should be appreciated that since linoleic acid occurs in nature as a complex mixture in every instance, it is available in various degrees of purity ranging from relatively expensive pure linoleic acid that has been laboriously purified to crude sources such as tall oil and soap stock which contain substances other than fatty acids. In actual practice linoleic acid rich mixtures of fatty acids are used to prepare the polymeric fat acids. One method of obtaining the linoleic acid rich fatty acids is by separating a major portion of the oleic and saturated fatty acids from any convenient and economical source of fatty acids having a high iodine value. In addition, polymeric fat acids are readily available commercial products. One such product is "Empol 1022" as sold by Emery Industries, Inc.

RESIN A

Resin A is a condensation product of polymeric fat acids and a polyalkylene polyamine. Suitable polyalkylene polyamines include diethylene triamine, triethylene tetramine, tetraethylene pentamine, 3,3'-imino-bispropylamine, and the like. Thus these polyalkylene polyamines contain two primary amine groups and from one to three secondary amine groups, all separated by short chain alkylene groups having 2 to 4 carbon atoms. The ratio of equivalents of polyamine to equivalents of carboxyl should be such that cross linking and hence gelation are avoided. For example in the case of diethylene triamine a ratio of 1½ equivalents of amine to 1 equivalent of carboxyl is preferred, taking into account the total carboxyl in the polymeric fat acid mixture including the monomer as well as the higher polymers present. In the case of triethylene tetramine a higher amine ratio such as 2.6 equivalents of amine per equivalent of carboxyl is preferred. In general, the higher the amine functionality of the polyamine the higher the ratio of amine equivalents per carboxyl equivalent that is required to produce a nongelling polyamide. Accordingly the particular excess of amine to be employed in each instance can readily be determined. Usually it is not necessary to go outside the range of 1.3 to 3.0 equivalents of amine per equivalent of carboxyl.

The polymeric fat acids either in the form of the free acid or in the form of the lower alkyl esters thereof are reacted with the polyalkylene polyamine at a temperature of around 200° C. After about 2 hours at this reaction temperature the reaction mixture is subjected to a vacuum for the purpose of removing the volatile byproducts of reaction. The condensation involves principally the primary amine groups but to some extent the secondary amine groups are also involved in the reaction.

At room temperature these resins are soft, tacky and resistant to greases, oils, water, water vapor, alkali, can-packing brines and syrups, and a number of organic solvents. The resins have an average molecular weight within the range of 2,500 to 6,500 and an acid number usually below 10.

In accordance with the present invention, it has been found that it is possible to modify markedly the characteristics of this resin by subjecting it to the bodying treatment following the condensation. As was pointed out above the condensation reaction does to some appreciable extent involve the secondary amine groups as well as the primary amine groups. It has been found that by subjecting the resin to a bodying treatment at an elevated temperature within the approximate range of 200–300° C. for a period of from 6–30 hours, it is possible to effect amide interchange between the secondary and primary amine groups within resin A itself such that the characteristics of the resin are materially modified. It is found that the number of free secondary amine groups in the polyamide increases materially while the number of free primary amine groups decreases materially. The bodying is accompanied by some slight reduction in the acid number but this is not appreciable. This bodying treatment also affects the physical properties of the resin. It is found that there is a significant change in the viscosity of the resin. This increase in viscosity, as a result of the bodying treatment, may be from 1 to 2 letters on the Gardner-Holdt viscosity scale as determined on a 35% solution by weight in butanol-toluene, 1–1 or an increase of approximately 200 cps. on the Brookfield scale (20 r.p.m. 370° F. #4 spindle). It has been determined that for the purpose of the present invention the preferred compositions are those in which resin A has been heat bodied to a Gardner-Holdt viscosity between C and F and especially those bodied to between D and E.

This bodying of the resin A also improves the characteristics of the blend of polyamides in that an adhesive containing this bodied resin A forms bonds which are materially stronger than an adhesive which contained unbodied resin A of the same viscosity, wherein the viscosity was attained by a slight adjustment in the proportion of reactants. Thus a polyamide that has obtained a given viscosity as a result of bodying treatment subsequent to the condensation reaction possesses superior properties as compared to the identical unbodied polyamide as compared to a polyamide which has attained the same viscosity during the condensation reaction through the use of modified reactant ratios.

RESIN B

Resin B is a high-melting, hard polyamide resin derived from a mixture of polymeric fat acids similar to those used in preparing resin A and an additional polycarboxylic acid, the latter having at least 2 carboxyl groups which are separated by at least 3 and not more than 8 carbon atoms. Typical of such polybasic acids are the aliphatic acids, glutaric, adipic, pimelic, suberic, azelaic, and sebacic, and the aromatic acids, terephthalic and isophthalic acids. Instead of the free acids, the lower aliphatic esters or the anhydrides may be used. The melting point of the copolymer resin may vary within the range of 130–210° C. depending upon the particular relative reactant ratios as well as reaction conditions. Desirable copolymers from adipic acid melt at 200–205° C.; from sebacic acid at 170–190° C.; and from terephthalic acid at 165–170° C. In general these copolymer polyamide resins B are prepared from a mixture of polycarboxylic acids containing from 85–98% by weight of fatty polymeric acids and from 2–15% by weight of the additional polycarboxylic acids.

In the preparation of resin B the mixture of polybasic acids is reacted with an alkylene diamine in which the alkylene radical has from 2 to 4 carbon atoms such as ethylene diamine; 1,2- and 1,3-diamino-propane; 1,2-, 1,3-, and 1,4-diamino-butane, and the like. The reactions are mixed in approximately equivalent quantities and heated under essentially the same conditions as have been described for resin A. However, when the condensation is substantially complete there is no need for subjecting resin B to a bodying treatment although this is permissible.

Resin B at room temperature is a very hard copolymer which has good resistance to greases, oils, water and water vapor, alkalies, mild acids, can-packing brines and syrups, alcohols, and most organic solvents. The average molecular weight of resin B is from 7,000 to 10,000.

Resin A and resin B are then blended and subjected to an additional amide interchange reaction between the amino groups of both resins. For this purpose the resins are mixed in the relative proportions of from 60–75% of resin A and from 25–40% of resin B and preferably in the proportion of 65% of resin A to 35% of resin B. After extensive experimentation it was found that if the amount of resin A is greater than 75% of the composition the resulting adhesive is too soft and lacks sufficient cohesive strength, while if the amount of resin A is less than 60% of the composition the resulting adhesive is harder and less flexible.

The blending operation is for the simple purpose of securing a homogeneous reaction mixture and accordingly it may be carried out in many ways. Since however, it is desirable to have the amide interchange reaction take place uniformly it is preferred to effect a homogeneous blend of the two resins as rapidly as possible. For this purpose it is preferred to melt the lower melting resin A and to disperse in this molten resin A particles or pieces of resin B. These pieces should be egg size or smaller so that they will liquefy rapidly and form a homogeneous mixture before any substantial quantity of resin B which has first gone into solution, has had an opportunity to react with the resin A. The mixture is subjected to agitation to insure a homogeneous blend and the surface of the blended resins is maintained under an inert atmosphere to prevent oxidative deterioration.

Satisfactory blending can be accomplished at temperatures in the approximate range of 200–300° C. and preferably within the approximate range of 200–220° C. If blending is done below 200° C. the components lack sufficient fluidity for intimate mixing whereby a nonhomogeneous composition results. When such nonhomogeneous blends are then held molten at temperatures close to the melting point of the composition the higher melting resin B has a tendency to separate and form gel particles in the mass. If too high a temperature is maintained during blending, the first portions of resin B to melt may take part in the amide interchange reaction to some degree before the entire amount of resin B becomes molten, and accordingly a nonuniform product may result.

During the blending operation it is necessary only to allow sufficient time to insure a homogeneous blend. The time interval is dependent upon the temperature of blending, the size of the resin B pieces added, and the efficiency of agitation. I have found that by adding egg sized or smaller pieces of resin B to molten resin A at about 200° C. using a mechanically operated agitator a time interval of about 30–60 minutes is sufficient.

The amide interchange reaction between resin A and resin B takes place readily at temperatures above approximately 200° C. and is accompanied by a rather rapid reduction in the melting point of the blends. As equilibrium is approached there is a sharp decline in the rate at which the melting point drops and consequently there is a leveling off in the curve obtained by plotting melting points against time. The product thus has a relatively stable melting point.

Further reaction is possible between the two resins which would to some extent result in a further melting point drop but the rate of this drop in melting point is very low.

A suitable temperature range for the amide interchange reaction is the range of 200–220° C. At 200° C. a period of about 16 hours is suitable while at 220° C. a time of about 1 hour is generally sufficient.

In order to determine a suitable time period at any given temperature the reaction may be carried on as follows. The blend of resins is held at a suitable reaction temperature and a sample is withdrawn at short intervals during the process for the determination of a melting point. By following the course of the reduction in melting point it is possible to determine the point at which the rate of melting point drop decreases sharply. Heating is then discontinued and the resin composition is removed from the reaction vessel and packaged for subsequent use.

In determining the suitability of any cement the tear burst values or peel strengths are ordinarily determined. High peel strengths ordinarily indicate desirable characteristics of such cements. By peel strength is meant the force required to separate two sheets bonded together with the adhesive. Although various can companies have various tests for determining the peel strength in which certain particular equipment is used, peel strength as used herein can be defined as the force required to separate two sheets bonded together by separating the bonded sheets by pulling them over ½" diameter roll guides at the speed of one inch per minute. The roll guides are supported in a jig which can be used in any conventional tester such as a Dillon tester. One end of the jig is attached to one end of the tester, the other end of the tester being attached to the ends of the two bonded sheets which lie over opposite roller guides.

*Example I*

A bodied resinous polyamide having a Brookfield viscosity of 7 poises at 187.8° C., an amine number of 45 and a color of 11, a melting point of 357° F. was modified with various percentages by weight based on the polyamide of an epoxy resin derived from Bisphenol A and epichlorohydrin having an epoxy equivalent weight of about 485. The polyamide was composed of a bodied blend of 65% resin A and 35% resin B. Resin A was prepared from polymeric fat acids derived from linoleic acid and diethylene triamine by heating at about 200° C. for about 3 hours and subsequent bodying at about 205° C. for 12 hours, to provide a resin having an amine number of about 90 and a Brookfield viscosity of about 13 poises at 150° C. Resin B was prepared from the same polymeric fat acids, sebacic acid and ethylene diamine by reaction at about 200° C. for about 4 hours, to provide a resin having an amine number of 3 and a Brookfield viscosity of 3.5 poises at 200° C. Resin B was then added to resin A at approximately 220° C. The heating was continued until the melting point of samples withdrawn was 181° C.

The peel strength or tear burst was measured on samples of can maker's quality black plate bonded with the epoxy-polyamide composition by the method previously described in a Dillon tester. The results can be seen from the following table.

| Percent epoxy resin: | Peel strength in lbs. per .75 inch |
|---|---|
| .0 | 41 |
| .1 | 55 |
| .2 | 46 |
| .3 | 46 |
| .4 | 50 |

The solvent resistance was also tested. Samples were immersed in methanol for seven days after which time they demonstrated the following results.

| Percent epoxy resin: | Average percent penetration of methanol |
|---|---|
| 0 | 49 |
| .1 | 36 |

Metallic containers made in the conventional manner using the polyamide-epoxy cement in the seams are rigid and the seams will not fail under ordinary handling in manufacturing, packing and shipping.

It is apparent from the foregoing example that containers having seams bonded with the polyamide-epoxy composition previously described will provide seams having high peel strength which compares favorably with conventional tin-lead solder. While high peel strength can be obtained with modification up to .5% epoxy resin, it is apparent that less than .25% epoxy resin is more suitable and preferably about .1%, which shows the highest peel strength.

The embodiments of the invention in which an exclusive property or privilege is claimed are defined as follows:

1. A metallic container having seams, said seams being bonded by a resinous composition, said composition comprising a bodied polyamide resin and less than .5% of an epoxy resin, said polyamide resin bein a homogeneous blend of from 60–75% by weight of polyamide resin A and 25–40% by weight of polyamide resin B, said resin A being the bodied reaction product of polymeric fat acids and a polyalkylene polyamine, said resin B being the reaction product of an alkylene diamine and a mixture of polymeric fat acids, and a polycarboxylic acid selected from the group consisting of aliphatic and aromatic polycarboxylic acids, the blend of resin A and resin B having been treated at a temperature within the approximate range of 200° to 220° C. for a time sufficient to effect an amide interchange between the resins, said epoxy resin being the reaction product of Bisphenol A and epichlorohydrin and having an epoxy equivalent weight of from 170 to 1,000.

2. A metallic container as defined in claim 1 in which said epoxy resin is employed in an amount of about .1%.

3. A metallic container as defined in claim 1 in which said polyalkylene polyamine is diethylene triamine, the alkylene diamine is ethylene diamine and the polycarboxylic acid is sebacic acid.

References Cited in the file of this patent

UNITED STATES PATENTS

| 2,119,280 | Kronquest et al. | May 31, 1938 |
| 2,705,223 | Renfrew et al. | May 29, 1955 |
| 2,839,219 | Groves et al. | June 17, 1958 |
| 2,867,592 | Morris et al. | Jan. 6, 1959 |
| 2,886,543 | Peerman et al. | May 12, 1959 |
| 2,919,255 | Hart | Dec. 29, 1959 |